United States Patent
Khalil et al.

(10) Patent No.: US 8,531,675 B2
(45) Date of Patent: Sep. 10, 2013

(54) COMPENSATED MEMS FTIR SPECTROMETER ARCHITECTURE

(75) Inventors: Diaa A. Khalil, Cairo (EG); Bassem Mortada, Nasr (EG); Mohamed Nabil, Cairo (EG); Mostafa Medhat, Cairo (EG); Bassam A. Saadany, Cairo (EG)

(73) Assignee: Si-Ware Systems, Inc., Cairo (EG)

( * ) Notice: Subject to any disclaimer, the term of this patent is extended or adjusted under 35 U.S.C. 154(b) by 408 days.

(21) Appl. No.: 12/877,888

(22) Filed: Sep. 8, 2010

(65) Prior Publication Data

US 2011/0058180 A1    Mar. 10, 2011

Related U.S. Application Data

(60) Provisional application No. 61/240,531, filed on Sep. 8, 2009.

(51) Int. Cl.
*G01B 9/02* (2006.01)

(52) U.S. Cl.
USPC .......................................... 356/450; 356/452

(58) Field of Classification Search
USPC ......................................... 356/450–452, 521
See application file for complete search history.

(56) References Cited

U.S. PATENT DOCUMENTS

| 3,443,871 A | * | 5/1969 | Chitayat | 356/498 |
| 6,967,722 B2 | * | 11/2005 | Manning | 356/452 |
| 7,796,267 B2 | * | 9/2010 | Saadany et al. | 356/450 |
| 2004/0136006 A1 | * | 7/2004 | Abbink | 356/451 |

FOREIGN PATENT DOCUMENTS

EP    1906159 A1    4/2008

OTHER PUBLICATIONS

Al-Saeed, T., "Dispersion compensation in moving-optical-wedge Fourier transform spectrometer," Optical Society of America, Jul. 10, 2009, vol. 48, No. 20, pp. 3979-3987 (9 pages).
International Search Report and Written Opinion for PCT/US2010/048169 mailed Nov. 30, 2010 (12 pages).

* cited by examiner

*Primary Examiner* — Tarifur Chowdhury
*Assistant Examiner* — Jonathan Hansen
(74) *Attorney, Agent, or Firm* — Garlick & Markison; Holly L. Rudnick

(57) ABSTRACT

A Micro Electro-Mechanical System (MEMS) spectrometer architecture compensates for verticality and dispersion problems using balancing interfaces. A MEMS spectrometer/interferometer includes a beam splitter formed on a first surface of a first medium at an interface between the first medium and a second medium, a first mirror formed on a second surface of the first medium, a second mirror formed on a third surface of the first medium and balancing interfaces designed to minimize both a difference in tilt angles between the surfaces and a difference in phase errors between beams reflected from the first and second mirrors.

20 Claims, 14 Drawing Sheets

COMPENSATED MEMS FTIR SPECTROMETER ARCHITECTURE

CROSS REFERENCE TO RELATED PATENTS

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Application Ser. No. 61/240,531, entitled "Compensated MEMS FTIR Spectrometer Architecture," filed Sep. 8, 2009.

BACKGROUND OF THE INVENTION

1. Technical Field of the Invention

The present invention relates in general to optical spectroscopy and interferometry, and in particular to the use of Micro Electro-Mechanical System (MEMS) technology in optical spectrometers.

2. Description of Related Art

Micro Electro-Mechanical Systems (MEMS) refers to the integration of mechanical elements, sensors, actuators and electronics on a common silicon substrate through microfabrication technology. For example, the microelectronics are typically fabricated using an integrated circuit (IC) process, while the micromechanical components are fabricated using compatible micromachining processes that selectively etch away parts of the silicon wafer or add new structural layers to form the mechanical and electromechanical components. MEMS devices are attractive candidates for use in spectroscopy, profilometry, environmental sensing, refractive index measurements (or material recognition), as well as several other sensor applications, due to their low cost, batch processing ability and compatibility with standard microelectronics. In addition, the small size of MEMS devices facilitates the integration of such MEMS devices into mobile and hand held devices.

Moreover, MEMS technology, with its numerous actuation techniques, enables the realization of new functions and features of photonic devices, such as optical tunability and dynamic sensing applications. For example, by using MEMS actuation (electrostatic, magnetic or thermal) to control a movable mirror of a Michelson Interferometer, small displacements in the interferometer optical path length can be introduced, and consequently, a differential phase between the interfering beams can be obtained. The resulting differential phase can be used to measure the spectral response of the interferometer beam (e.g., using Fourier Transform Spectroscopy), the velocity of the moving mirror (e.g., using the Doppler Effect), or simply as an optical phase delay element.

In MEMS-based spectrometers, beam splitting is typically performed using a thin wall of silicon (Si) or glass. For example, the beam splitter could be a silicon wall or simply an air-silicon (or any other material) interface. Such structures have the advantage of complete integration, since the mirrors and beam splitters are all fabricated in a single, self-aligned lithography step, without the need for any additional assembly of extra elements. However, in such structures, the optical beams typically pass through silicon in one arm, while the second arm is free from silicon (i.e., propagation in air only). As the silicon (or any other equivalent material for the beam splitter) has a refractive index that varies with the wavelength, dispersion may result due to the introduction of a phase error in the interferometer (i.e., a phase shift that is dependant on the wavelength).

To overcome this phase error, a complex Fourier transform (FT) is needed, instead of a simple cosine transform. In practice, the complex FT necessitates that the mirror move in the positive and negative directions with respect to its zero path difference position. Thus, for a mirror moving a distance L, the wavelength resolution is governed by only L/2 mirror displacement. However, the mirror motion in MEMS technology is usually limited by the full travel range of the actuator used to drive the mirror. Therefore, a loss in the travel range due to the phase error correction limits the wavelength resolution of the resultant spectrometer.

Another problem with existing MEMS-based spectrometers results from the fabrication process itself. Many MEMS-based spectrometers utilize a Deep Reactive Ion Etching (DRIE) on Silicon on Insulator (SOI) wafer technology to form the optical mirrors and beam splitters. Although DRIE allows the integration of different components using a simple lithographic process, DRIE suffers from poor verticality of the walls used to form the optical mirrors and beam splitters of the interferometer. For example, in DRIE technology, the state of the art of the wall verticality is on the order of 0.5 degrees with respect to the line vertical to the substrate, which is considered large in any interferometric measuring system. Typically, the accepted verticality angle (considered as a tilt angle) is on the order of few milliradians (<0.1 degree). This represents an obstacle for any DRIE based spectrometer, since the large tilt angle results in a reduction in the visibility and an increase in the insertion loss of the structure. In addition, the large tilt angle can also affect the wavelength accuracy and resolution of the interferometer. Moreover, the large tilt angle cannot be avoided by aligning the input beam, since there is an inherent misalignment between the beam splitter and the two acting mirrors.

Therefore, there is a need for a balanced architecture for the spectrometer, such that the tilt angle or verticality in the DRIE process used to create the mirrors and beam splitter walls are compensated in both arms, and the dispersion in one arm is balanced by a similar dispersion in the second arm.

SUMMARY OF THE INVENTION

Embodiments of the present invention provide a Micro Electro-Mechanical System (MEMS) interferometer that uses balancing interfaces to overcome the verticality and dispersion problems. The MEMS interferometer includes a beam splitter formed on a first surface of a first medium at an interface between the first medium and a second medium, a first mirror formed on a second surface of the first medium, a second mirror formed on a third surface of the first medium and the balancing interfaces.

The beam splitter is optically coupled to receive an incident beam and to split the incident beam into a first interfering beam propagating in the first medium and a second interfering beam propagating in the second medium. The first mirror is optically coupled to receive the first interfering beam and to reflect the first interfering beam to produce a first reflected interfering beam, while the second mirror is optically coupled to receive the second interfering beam and to reflect the second interfering beam to produce a second reflected interfering beam. The balancing interfaces are included in respective paths of the first and second interfering beams to minimize a difference in tilt angles and a difference in phase errors.

In an exemplary embodiment, a detector is optically coupled to detect an interference pattern produced as a result of interference between the first reflected interfering beam and the second reflected interfering beam and an actuator is coupled to one of the first mirror and the second mirror to cause a displacement thereof. The displacement produces an optical path length difference between the first reflected interfering beam and the second reflected interfering beam equal to twice the displacement.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1A:
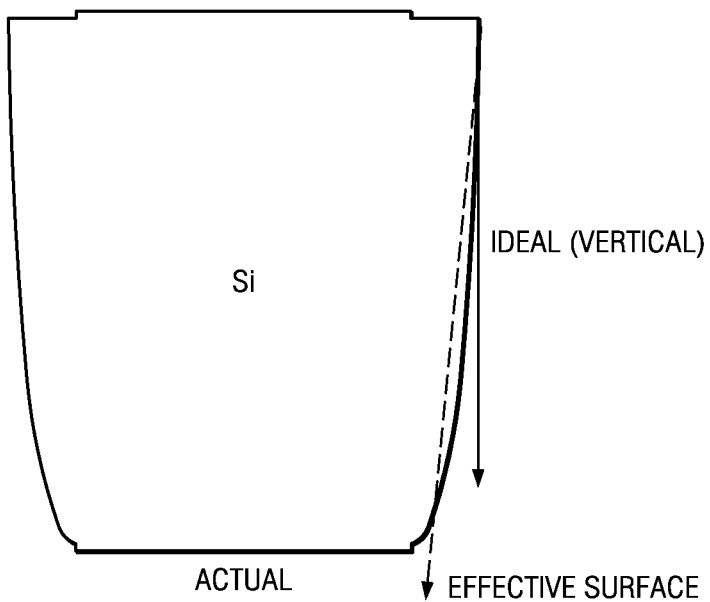
FIG. 1A is a pictorial diagram illustrating a typical etching profile of a structure formed using Deep Reactive Ion Etching (DRIE)
Figure 1B:
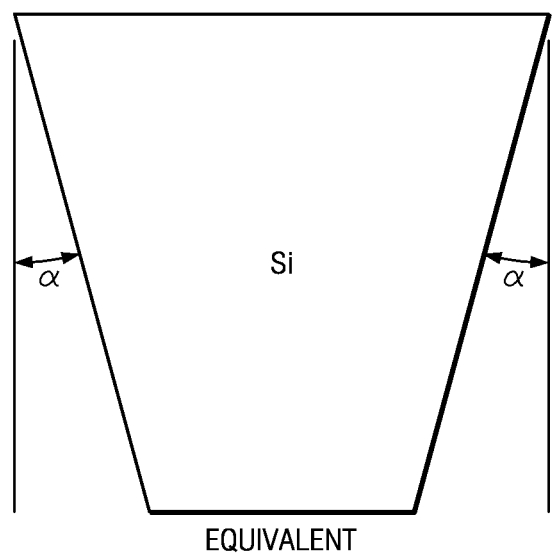
FIG. 1B is a pictorial diagram illustrating the etching profile of FIG. 1A approximated by a straight profile with a certain tilt angle.

In DRIE technology, the etching of deep trenches in silicon (and similarly in most common materials) is usually associated by a certain verticality error, which means that the vertical surface is not 100% vertical due to the variation of the etching rate with depth. For example, a typical etching profile of silicon (Si) using DRIE is shown in FIG. 1A. This profile can be approximated by the straight profile with a certain tilt angle α shown in FIG. 1B. The resulting surfaces with small angle α with respect to the vertical dotted lines represent the surfaces of the mirrors or beam splitters used in spectrometers/interferometers fabricated by this technology.

The over-etching in the bottom of the trenches typically has the same direction in all of the structures fabricated by the same technology parameters. As a result, when constructing a spectrometer/interferometer utilizing DRIE, the surfaces of the constructed mirrors and beam splitter all have a certain fixed angle α with respect to the vertical direction. However, this angle cannot be compensated for by the alignment of the input beam, since the angle is typically positive for some surfaces and negative for others. As a result, the output beams from the spectrometer/interferometer will have an angle θ (much greater than α) between them, which results in a significant visibility reduction in the output fringes obtained from the spectrometer.

In addition, in a conventional MEMS-based interferometer, since the beam of one arm is passing through silicon (or any other material), while the beam in the second arm is typically passing through the air, and the Si material (like any other material) could have a refractive index that changes with the wavelength, a phase error may be introduced in the signal obtained at the spectrometer output. Thus, instead of having an output signal that can be, after removing the DC component, expressed as:

$$I(x) = 2\int_0^\infty B(\sigma)\cos 2\pi x\sigma d\sigma, \quad \text{(Equation 1)}$$

where $B(\sigma)$ is the spectral distribution of the radiation to be measured as a function of the wave number σ, and where x is the optical path difference, the output signal is instead expressed as:

$$I(x) = \int_{-\infty}^{\infty} B(\sigma)\cos[2\pi x\sigma + \varphi(\sigma)]d\sigma, \quad \text{(Equation 2)}$$

where a phase error $\phi(\sigma)$ is present in the spectrometer.

Since $B(\sigma)$ may be extended to include negative frequencies, and assuming a real physical spectrum, then $B(\sigma)=(-\sigma)$. Thus, in a MEMS-based spectrometer without dispersion, the output signal can actually be expressed as:

$$I(x) = \int_{-\infty}^{\infty} B(\sigma)\cos 2\pi x\sigma d\sigma, \quad \text{(Equation 3)}$$

and a simple Fourier cosine transform is sufficient to give the spectrum in the form:

$$B(\sigma) = 2\int_0^\infty I(x)\cos 2\pi \sigma x dx. \quad \text{(Equation 4)}$$

However, when the spectrometer suffers from a dispersion effect, the spectrum can only be obtained via the complex Fourier transform. If $\phi(\sigma)=\phi(-\sigma)$, it can be shown that $B(\sigma)e^{j\phi(\sigma)}$ is the complex Fourier transform of I(x) as follows:

$$B(\sigma)e^{j\varphi(\sigma)} = J(\sigma) = \int_{-\infty}^{\infty} I(x)e^{-2j\pi\sigma x} dx \quad \text{(Equation 5)}$$

Figure 2A:
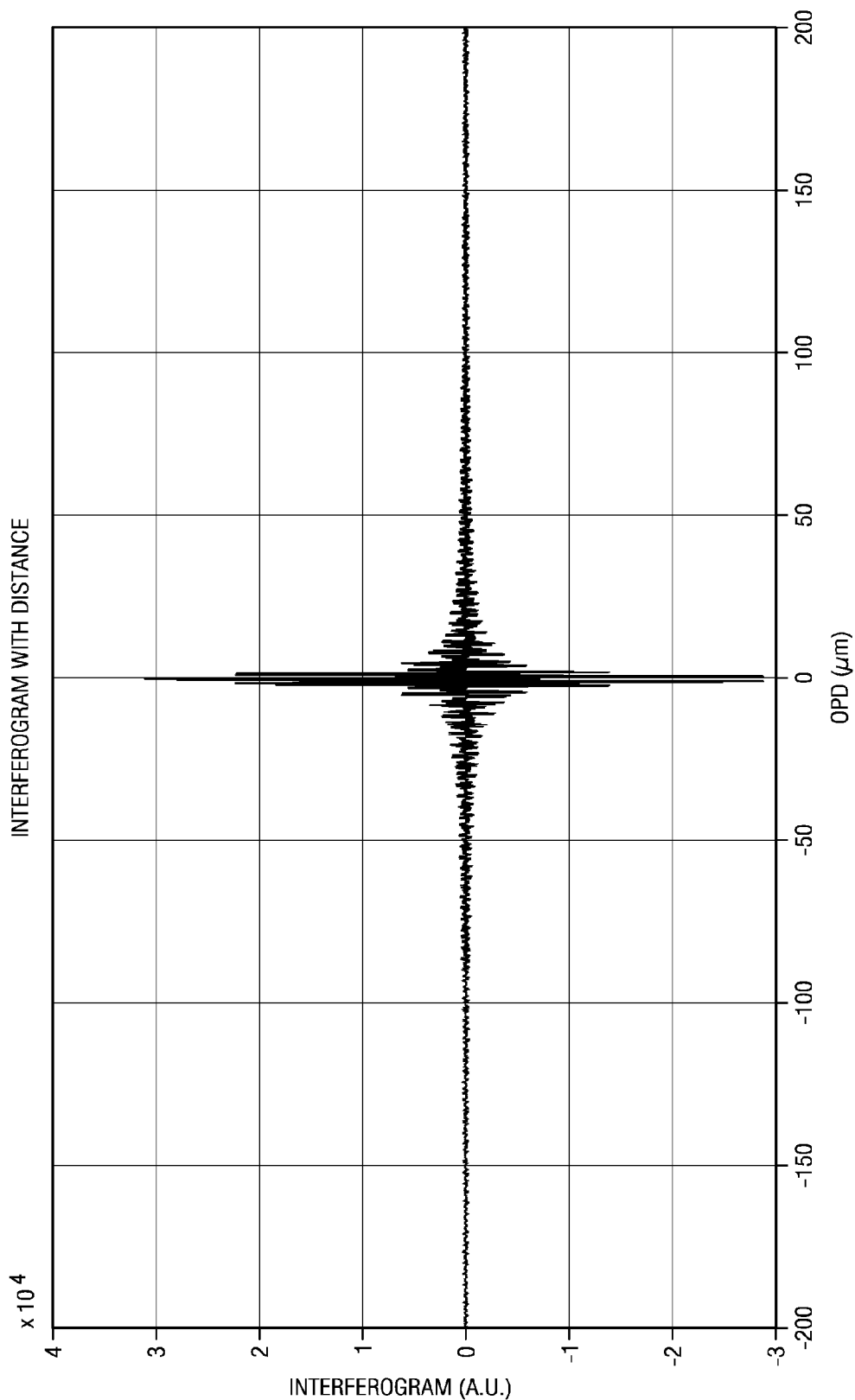
FIGS. 2A and 2B illustrate exemplary interferograms of a spectrometer without dispersion and with dispersion.
Figure 2B:
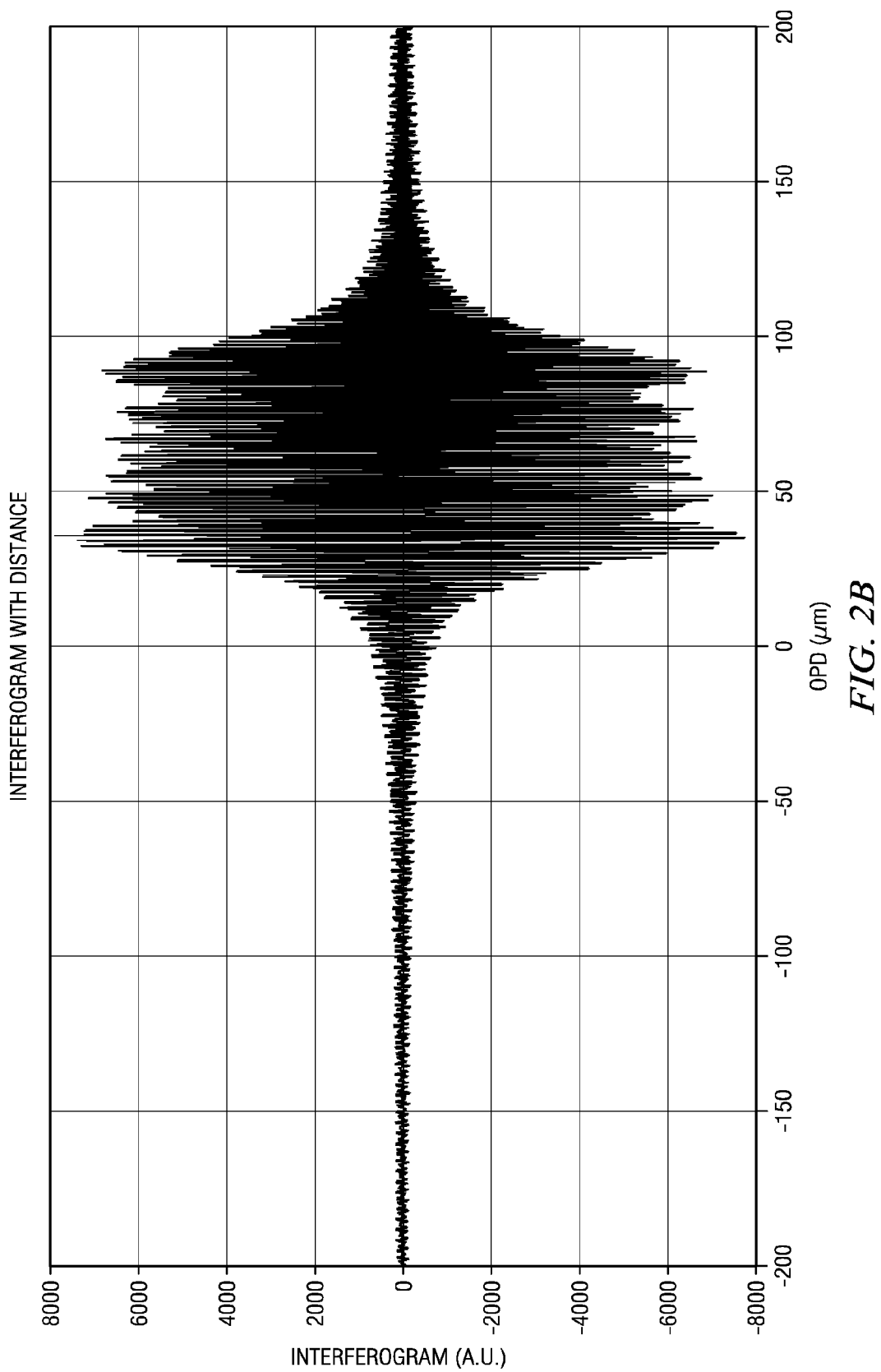

The spectrum is thus given by the square root of the sum of the squares of the (two sided) sine and cosine integrals:

$$B(\sigma)=|J(\sigma)|=[J_r^2(\sigma)+J_i^2(\sigma)]^{1/2} \quad \text{(Equation 6)}$$

where $J_r(\sigma)$ and $J_i(\sigma)$ are the real and imaginary parts of $J(\sigma)$. However, such a technique requires moving the mirror in both the positive and negative directions, which means that the Fourier transform must be doubled for a given resolution. To illustrate this issue, FIG. 2A shows the interferogram of a Michelson Interferometer without dispersion and FIG. 2B shows the interferogram of a Michelson Interferometer with dispersion. It can be easily seen from FIGS. 2A and 2B that the interferogram is extended over a wider optical path difference (or mirror displacement) range due to the material dispersion.

In accordance with embodiments of the present invention, a balanced architecture for a Micro Electro-Mechanical System (MEMS) spectrometer/interferometer is utilized, such that the tilt angle or verticality in the DRIE process used to create the mirrors and beam splitter walls are compensated in both arms, and the dispersion in one arm is balanced by a similar dispersion in the second arm. An exemplary embodiment uses geometrical balancing interfaces to enable the two arms of the optical interferometer to have substantially the same verticality of the mirrors and beam splitter, which improves the visibility of the fringes obtained in the spectrometer output, thus reducing the insertion loss, increasing the throughput and also improving the resolution of the spectrometer. In another exemplary embodiment, the balancing interfaces achieve a balance between the two arms on the spectrometer, such that the same wavelength dependant phase shift existing in one arm is introduced in the second arm to compensate for any dispersion in the spectrometer.

Figure 3A:
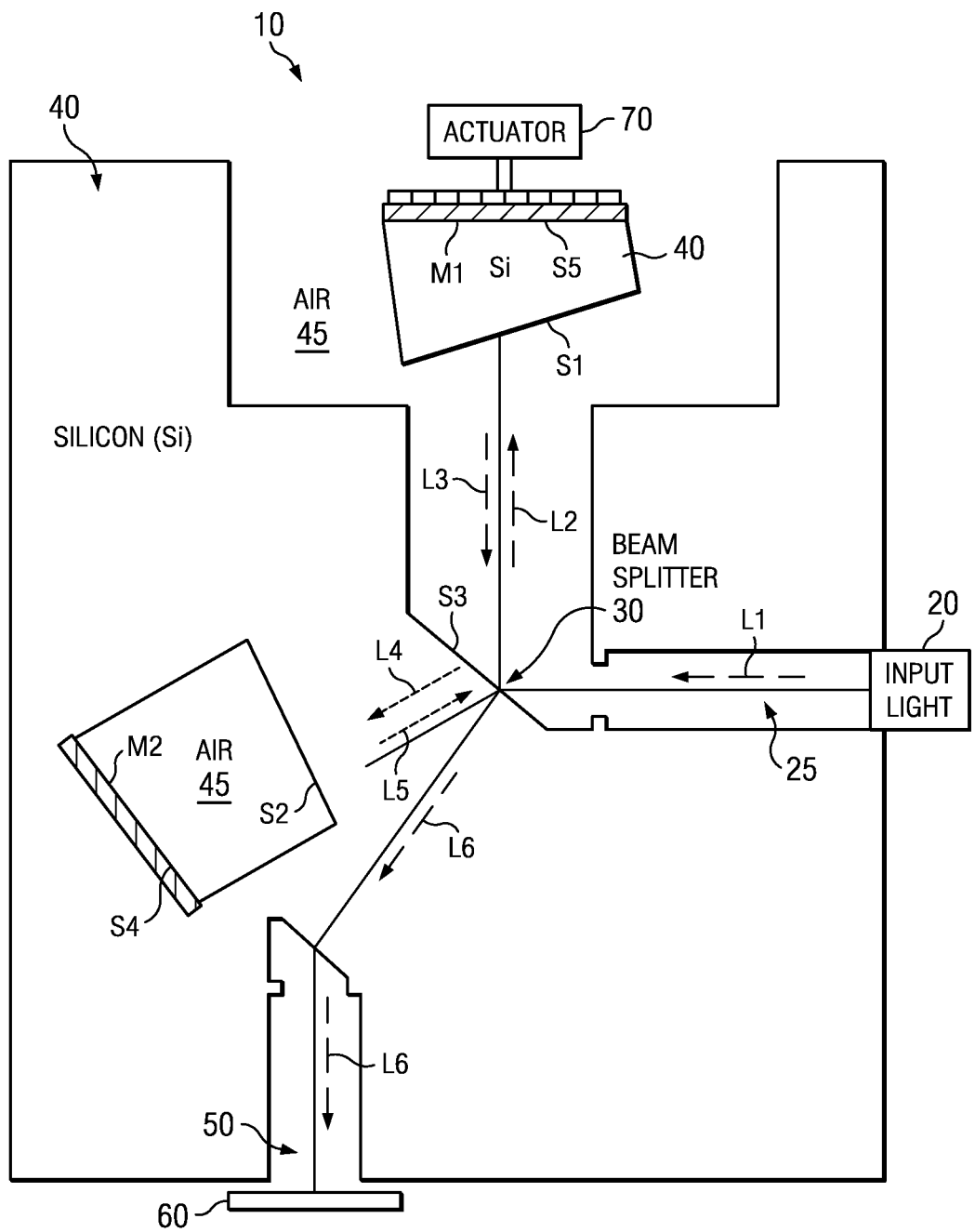
FIGS. 3A and 3B are diagrams illustrating an exemplary compensated MEMS spectrometer architecture, in accordance with embodiments of the present invention.
Figure 3B:
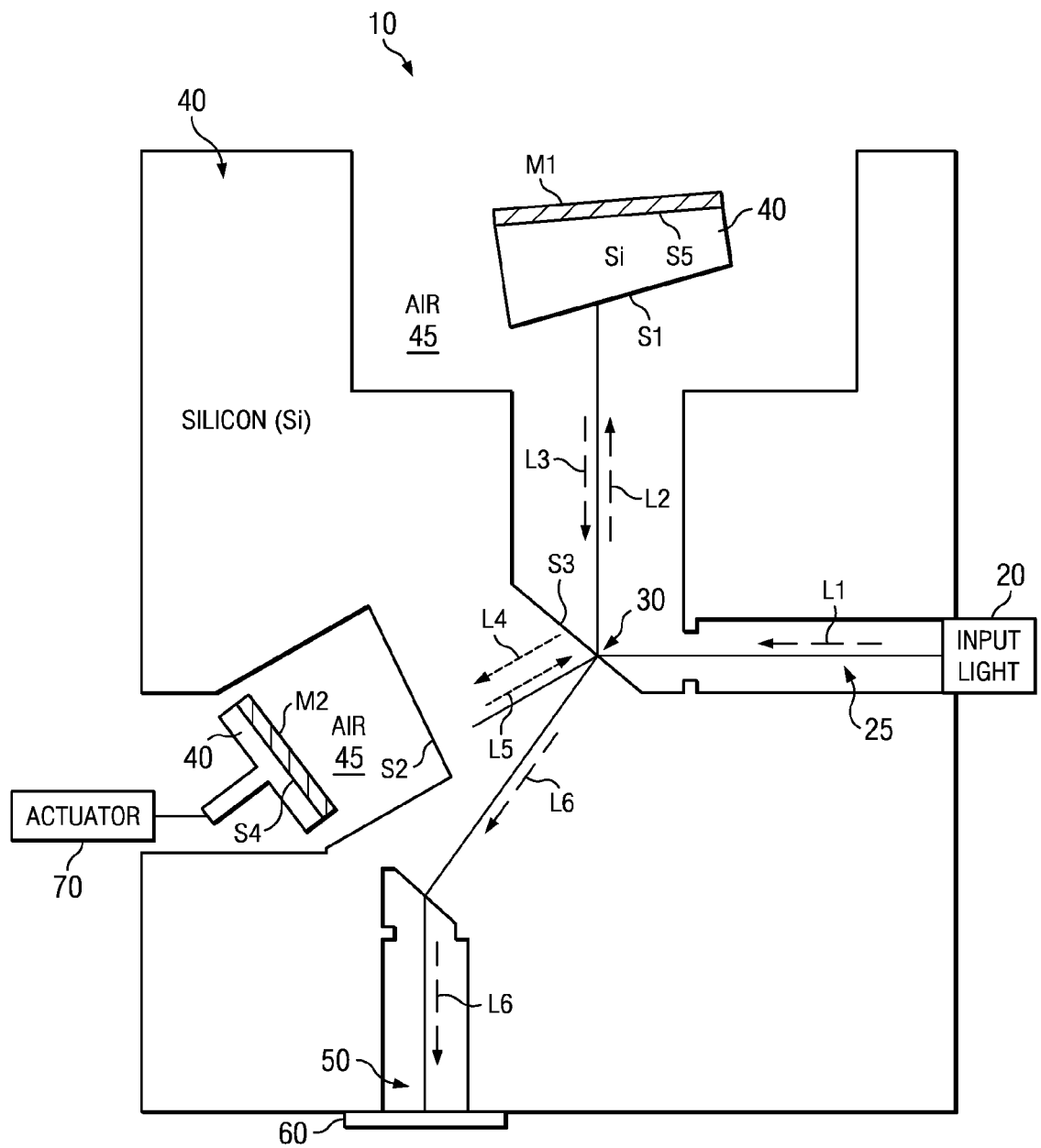

Referring now to FIGS. 3A and 3B, there are illustrated exemplary compensated MEMS-based spectrometer architectures 10, in accordance with embodiments of the present invention. The compensated MEMS-based spectrometer 10 may be, for example, a Fourier Transform Infrared (FTIR) interferometer. The spectrometer 10 is realized over an SOI wafer to allow for a MEMS-actuated moving mirror.

In FIGS. 3A and 3B, a light source 20 produces an incident beam L1 that enters the compensated MEMS-based spectrometer 10 through an input fiber groove 25. The incident beam L1 travels through the input fiber groove 25 until it reaches a half plane beam splitter 30 formed at an interface between a first medium (i.e., silicon (Si) 40) and a second medium (i.e., air 45). The silicon/air interface beam splitter 30 is positioned at an angle (for example, 45 degrees) from the incident beam L1. The desired angle is produced by photolithographically defining a surface S3 of the silicon medium 40 adjacent the input fiber groove 25.

Upon impinging the half plane beam splitter 30, the incident beam L1 is split into two interfering beams L2 and L4. L2 originates from the partial reflection of the incident beam L1 from the silicon/air half plane beam splitter 30, and thus has a reflection angle equal to the beam incidence angle. L4 originates from the partial transmission of the incident beam L1 through silicon/air half plane beam splitter 30 and propagates in silicon 40 at a refraction angle (determined by Snell's law). As a result, L2 propagates in air 45 towards mirror M1, while L4 propagates in silicon 40 towards mirror M2.

Mirror M1 is formed on another surface S5 on the silicon medium 40 at an angle perpendicular to the beam L2. In particular, mirror M1 is oriented with respect to a direction of propagation of L2 to enable L2 to propagate first through air 40 until impinging upon surface S1 of silicon 40, and then propagate through the silicon medium 40 to reach the mirror M1. Likewise, mirror M2 is formed on yet another surface S4 of the silicon medium 40 at an angle perpendicular to the beam L4. However, M2 is oriented with respect to a direction of propagation of L4 to enable L4 to propagate first through silicon 40 until reaching surface S2 of the silicon medium 40, and then propagate through air 45 to reach the mirror M2. Beam L2 is reflected by mirror M1, thus producing reflected beam L3, while beam L4 is reflected by mirror M2, thus producing reflected beam L5. As shown in FIG. 3A, both beams L3 and L5 take the same optical path of L2 and L4 respectively (in the opposite direction) after reflection from mirrors M1 and M2 respectively, back towards the half plane beam splitter 30. Thus, in embodiments in which the spectrometer/interferometer is used as a Fourier Transform (FT) spectrometer, one interferometer arm is formed by beams L2/L3 and includes the beam splitter 30 and mirror M1, while another interferometer arm is formed by beams L4/L5 and includes mirror M2.

An interference pattern L6 is produced from reflected beams L3 and L5 interfering starting at the beam splitter 30. The interference pattern L6 is output via output fiber groove 50 and detected by detection plane (detector) 60. In one embodiment, the detector 60 includes a photodetector that is assembled through micromachining in the substrate (e.g., by etching the top surface of the substrate to realize an opening within which the photodetector may be placed) or that is realized monolithically within the substrate either through doping (e.g., to realize a P-I-N diode) or partial metallization (e.g., to realize metal-semiconductor-metal MSM photodetector).

In an exemplary embodiment, as shown in FIG. 3A, mirror M1 is movable using a SOI electrostatic MEMS actuator 70, while in FIG. 3B, mirror M2 is moveable using the electrostatic MEMS actuator 70. For example, in one embodiment, the electrostatic MEMS actuator 70 is formed of a comb drive and spring. By applying a voltage to the comb drive, a potential difference results across the actuator 70, which induces a capacitance therein, causing a driving force to be generated as well as a restoring force from the spring, thereby causing a displacement of moveable mirror M1 or M2 to the desired position for reflection of the beam L2 or L4. Regardless of which mirror M1 or M2 is moveable, an optical path length difference (OPD) between beams L3 and L5 can be achieved that is substantially equal to twice the mirror displacement.

In one embodiment, mirrors M1 and M2 are metallic mirrors, where selective metallization (e.g. using a shadow mask during metallization step) is used to protect the beam splitter. In another embodiment, non-metallic vertical Bragg mirrors are used to obtain a small foot print spectrometer. The Bragg mirrors can be realized using Deep Reactive Ion Itching (DRIE), thus producing successive vertical silicon/air interfaces. In addition, the Bragg mirrors can be designed either to have a wide spectrum reflection response to act as simple reflectors or with a wavelength selective response, depending on the application.

Although a silicon/air interface is described herein for the beam splitter, other mediums providing a half wave plane beam splitter can be used to realize the invention. For example, in another exemplary embodiment, micromachined or assembled glass half-planes or other materials, such as Pyrex, can be used instead of silicon to allow for a wider spectral window of operation. In addition, other materials, such as liquids or different gases, can be used instead of air to provide a degree of freedom to modify the reflection coefficient of the half plane beam splitting interface.

Regardless of the types of mediums used, since the two beams L2/L3 and L4/L5 are passing through both the first medium 40 and the second medium 45, the dimensions of the structure can be adjusted such that the two beams L2/L3 and L4/L5 pass equal distances in medium (silicon 40). Therefore, the OPD is only in the medium (air 45) path. This results in a substantially complete compensation for the material (i.e., Si) dispersion in the interferometer functionality, since the phase error is introduced equally in the two optical paths.

Figure 4:
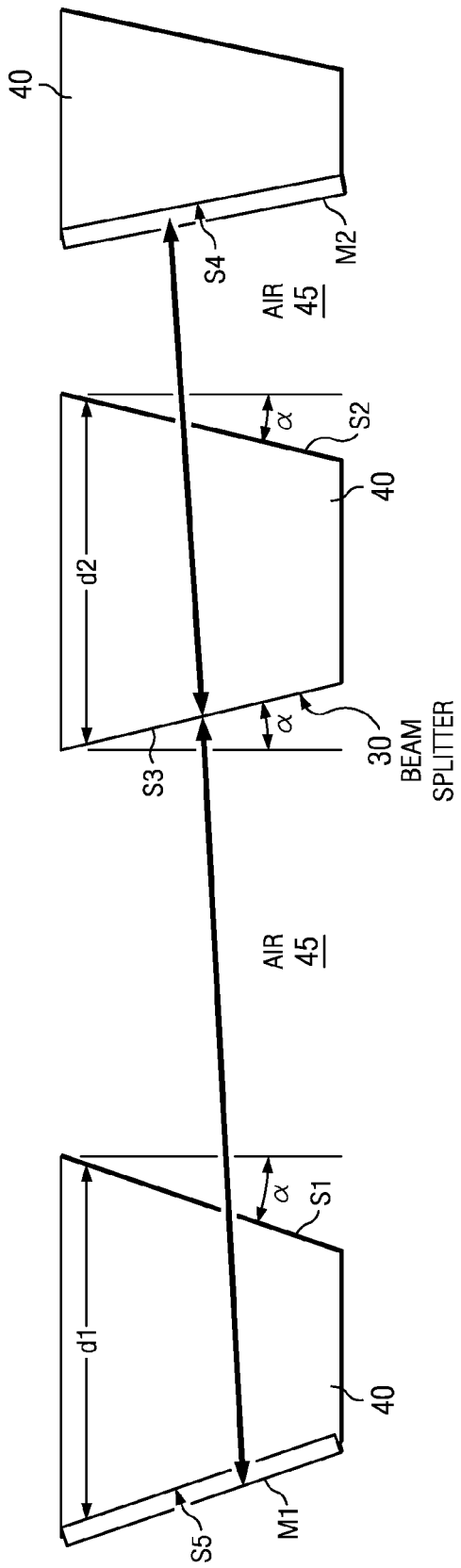
FIG. 4 is a pictorial diagram illustrating an exemplary orientation of components of the compensated MEMS spectrometer, in accordance with embodiments of the present invention.

For example, as illustrated in FIG. 4, with mirror M1 formed on surface S5 of silicon 40 and mirror M2 formed on surface S4 of silicon 40, beams L2/L3 pass through a distance d1 (i.e., a certain thickness) of silicon 40, while beams L4/L5 pass through a distance d2 (i.e., a certain thickness) of silicon 40. In accordance with embodiments of the present invention, to compensate for the beam dispersion in silicon, d1 is substantially equal to d2 (i.e., d1=d2). Thus, surfaces S3/S2/S4 and surfaces S3/S1/S5 form balancing interfaces that are designed to minimize the difference in respective phase errors between beams L3 and L5.

In addition, as shown in FIG. 4, the beam splitter 30 and the two mirrors M1 and M2 each have substantially the same verticality (tilt angle α) in substantially the same direction. Thus, in spite of the verticality error or the existing tilt angle in the DRIE technology, all of the effective surfaces S3, S4 and S5 of the spectrometer are parallel. Therefore, the balancing interfaces formed by surfaces S3/S2/S4 and surfaces S3/S1/S5 also minimize the difference in tilt angles between the effective surfaces. The reflections from the two other surfaces S1 and S2 in the spectrometer/interferometer may be avoided using an orientation of surfaces S1 and S2 that causes beams reflected from surfaces S1 and S2 to be oriented in a different direction. However, surfaces S1 and S2 may increase the insertion loss of the spectrometer/interferometer 10. To reduce the insertion loss, surfaces S1 and S2 can be photolithographically defined to be normal to beams L1 and L2, respectively, or coated with an anti-reflection (AR) coating.

Moreover, the orientation of surfaces S1 and S2 can be designed to minimize the angle between the two reflected beams L3 and L5 that may result from the wavelength dependence of a transmission angle from a dielectric interface. This angular dispersion can be minimized by adjusting the orientation of surfaces S1 and S2, such that all wavelengths in the operating range have nearly the same angle between the two reflected beams L3 and L5. Thus, the interferometer spectral response has a better uniformity in terms of visibility and insertion loss.

Figure 5:
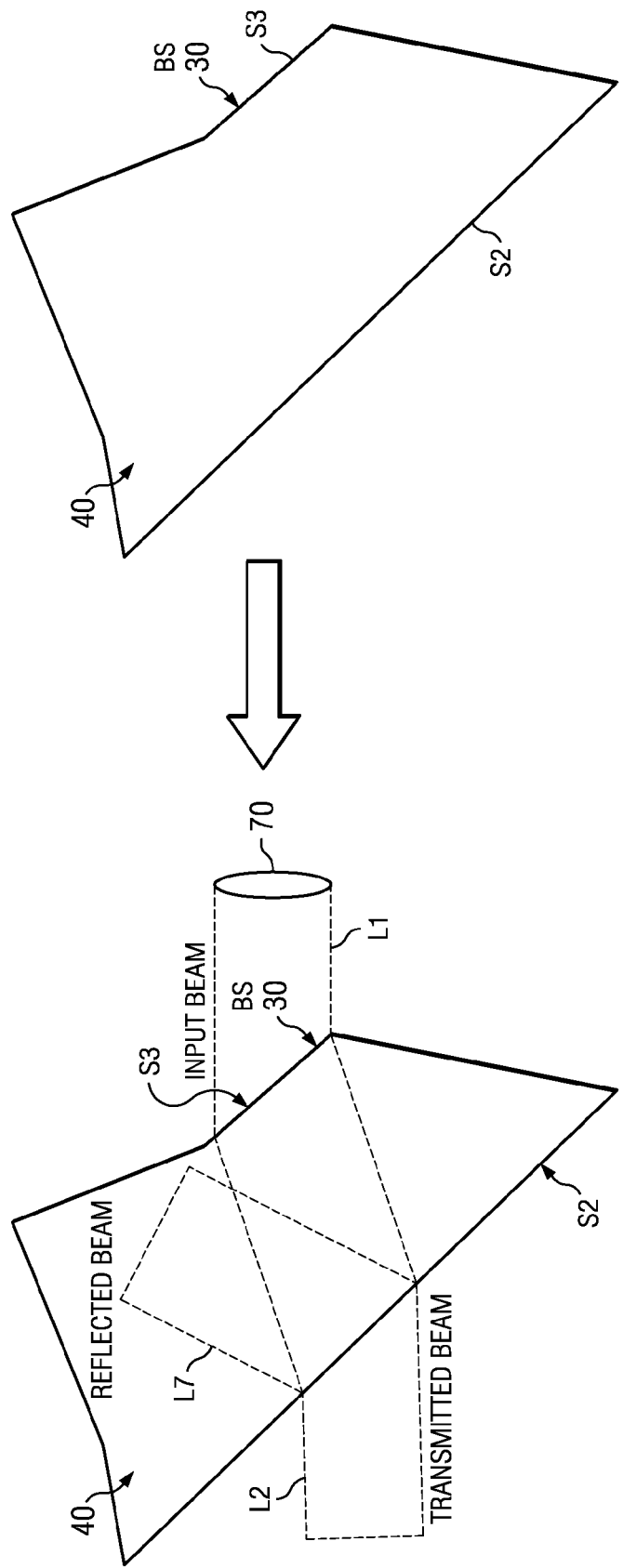
FIG. 5 is a pictorial diagram illustrating an exemplary design of a beam splitter, in accordance with embodiments of the present invention.

In exemplary embodiments, surface S2 of the silicon medium 40 may be parallel with the beam splitter 30 or have a certain angle with respect to the beam splitter 30. If S2 is parallel to the beam splitter surface S3, the Fabry-Perot effect between S2 and the beam splitter surface S3 may be eliminated by limiting the surface of the beam splitter 30 to an input spot size 70 of incident beam L1 and adjusting the separation between beam splitter surface S3 and surface S2 such that no reflected beam from surface S2 can face the beam splitter surface S3, as shown in FIG. 5. In FIG. 5, the reflected beam L7 from surface S2 does not face the beam splitter surface S3, and thus the Fabry-Perot effect is substantially eliminated.

Figure 6A:
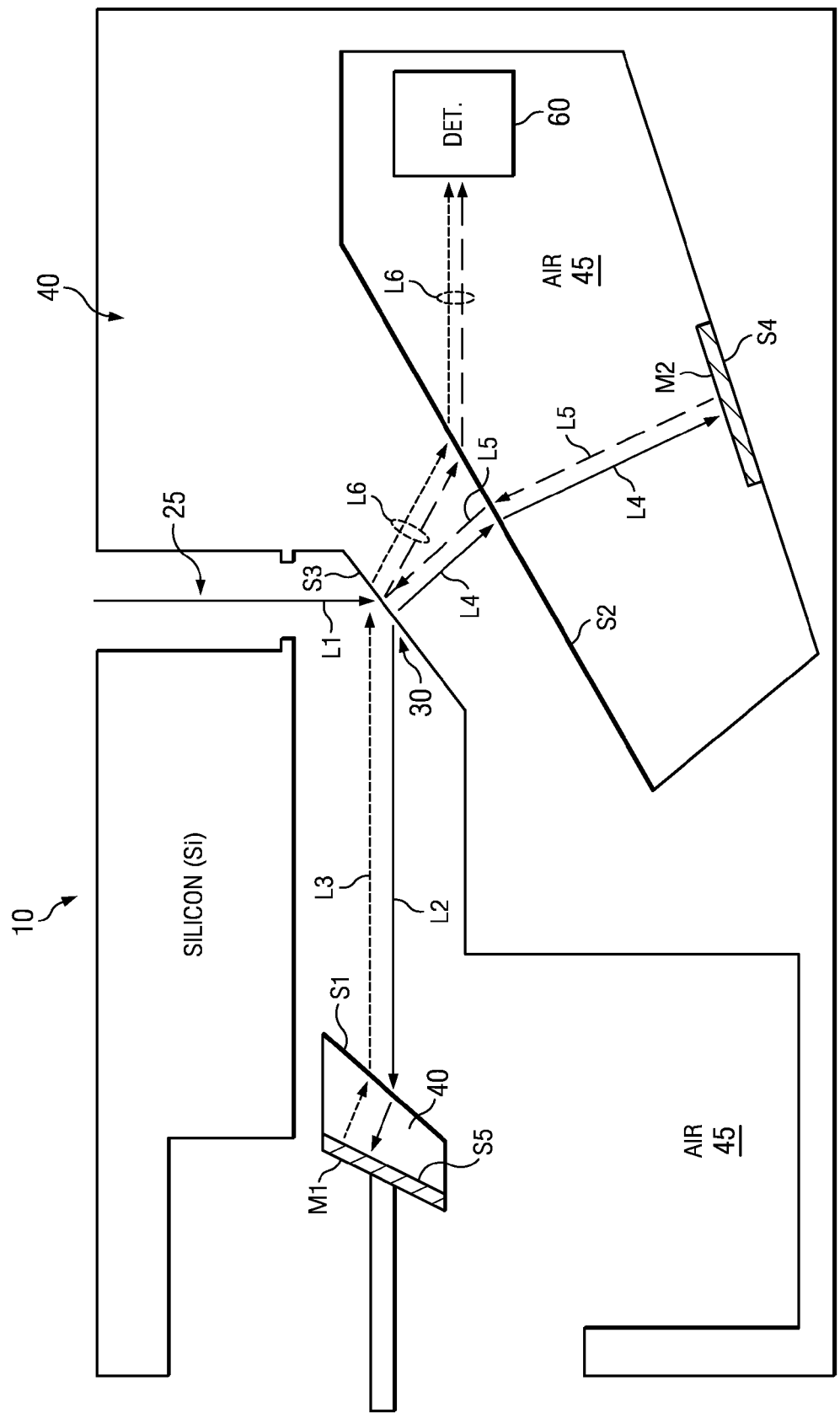
FIG. 6A is a diagram illustrating another exemplary compensated MEMS spectrometer architecture, in accordance with embodiments of the present invention.
Figure 6B:
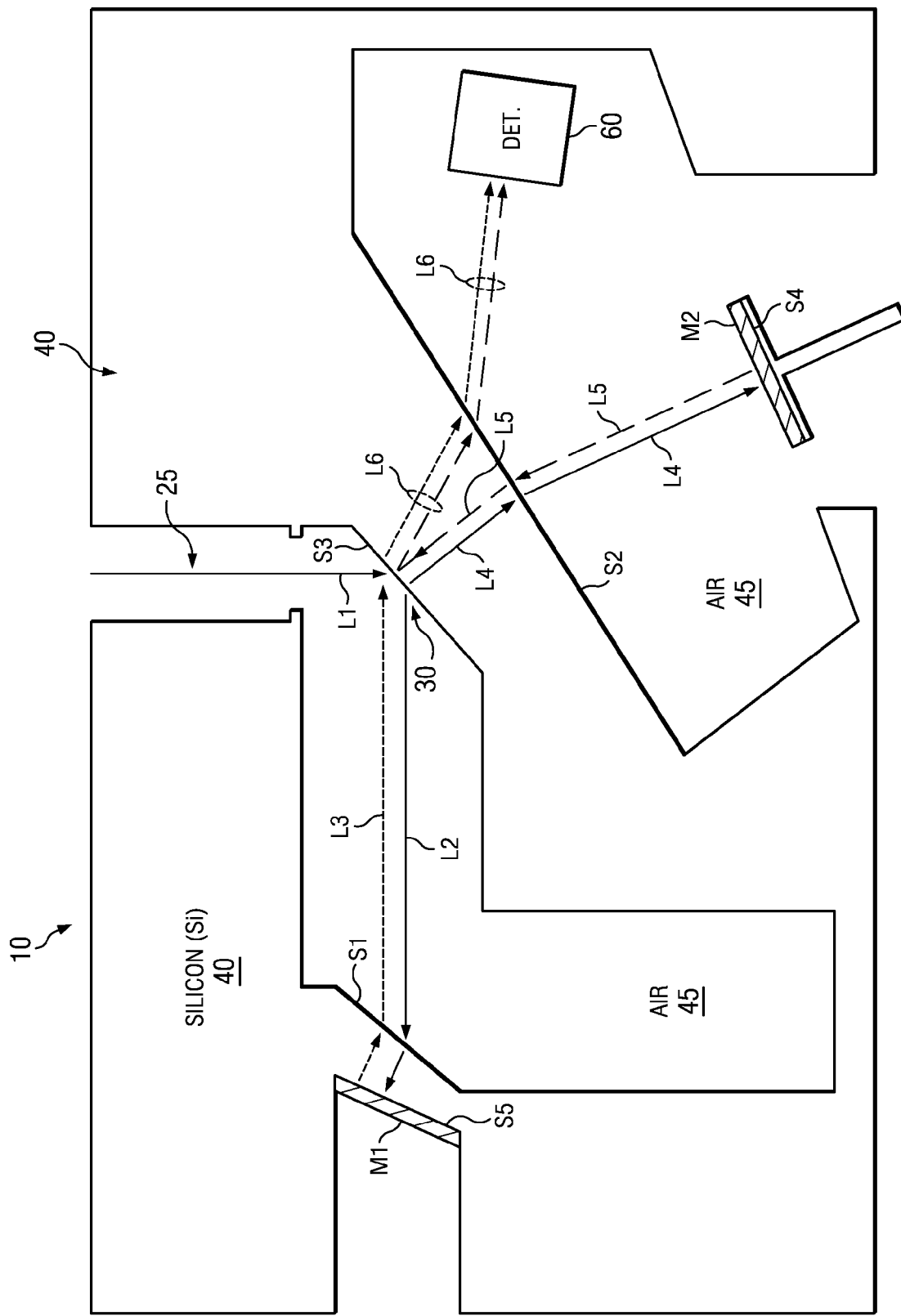
FIG. 6B is a diagram illustrating yet another exemplary compensated MEMS spectrometer architecture, in accordance with embodiments of the present invention.

Referring now to FIGS. 6A and 6B, surface S2 can also be used an interface for the output orientation of the detector 60. For example, as shown in FIGS. 6A and 6B, the interference pattern L6 can be directed towards the detector 60 by surface S2. In FIGS. 6A and 6B, the detector is positioned adjacent mirror M2 such that the interference pattern L6 is refracted from surface S2 towards detector 60 and away from mirror M2. This architecture is possible with either mirror M1 being moveable (as shown in FIG. 6A) or M2 being moveable (as shown in FIG. 6B).

In an exemplary operation, incident beam L1 enters the compensated MEMS-based spectrometer 10 through input fiber groove 25 and propagates through the input fiber groove 25 until it reaches the half plane beam splitter 30 formed on surface S3. Upon impinging the half plane beam splitter 30, the incident beam L1 is split into two interfering beams L2 and L4. L2 propagates in air 45 towards mirror M1, while L4 propagates in silicon 40 towards mirror M2. In particular, L2 propagates first through air 40 until impinging upon surface S1 of silicon 40, and then propagates through the silicon medium 40 to reach the mirror M1. L4 propagates first through silicon 40 until reaching surface S2 of the silicon medium 40, and then propagates through air 45 to reach the mirror M2.

Beam L2 is reflected by mirror M1, thus producing reflected beam L3, while beam L4 is reflected by mirror M2, thus producing reflected beam L5. Both beams L3 and L5 take the same optical path (in the opposite direction) after reflection from mirrors M1 and M2 respectively, back towards the half plane beam splitter 30. The interference pattern L6 produced as a result of reflected beams L3 and L5 interfering at the beam splitter 30 propagates through silicon 40 until it reaches surface S2, where it is refracted towards detector 60.

Figure 7:
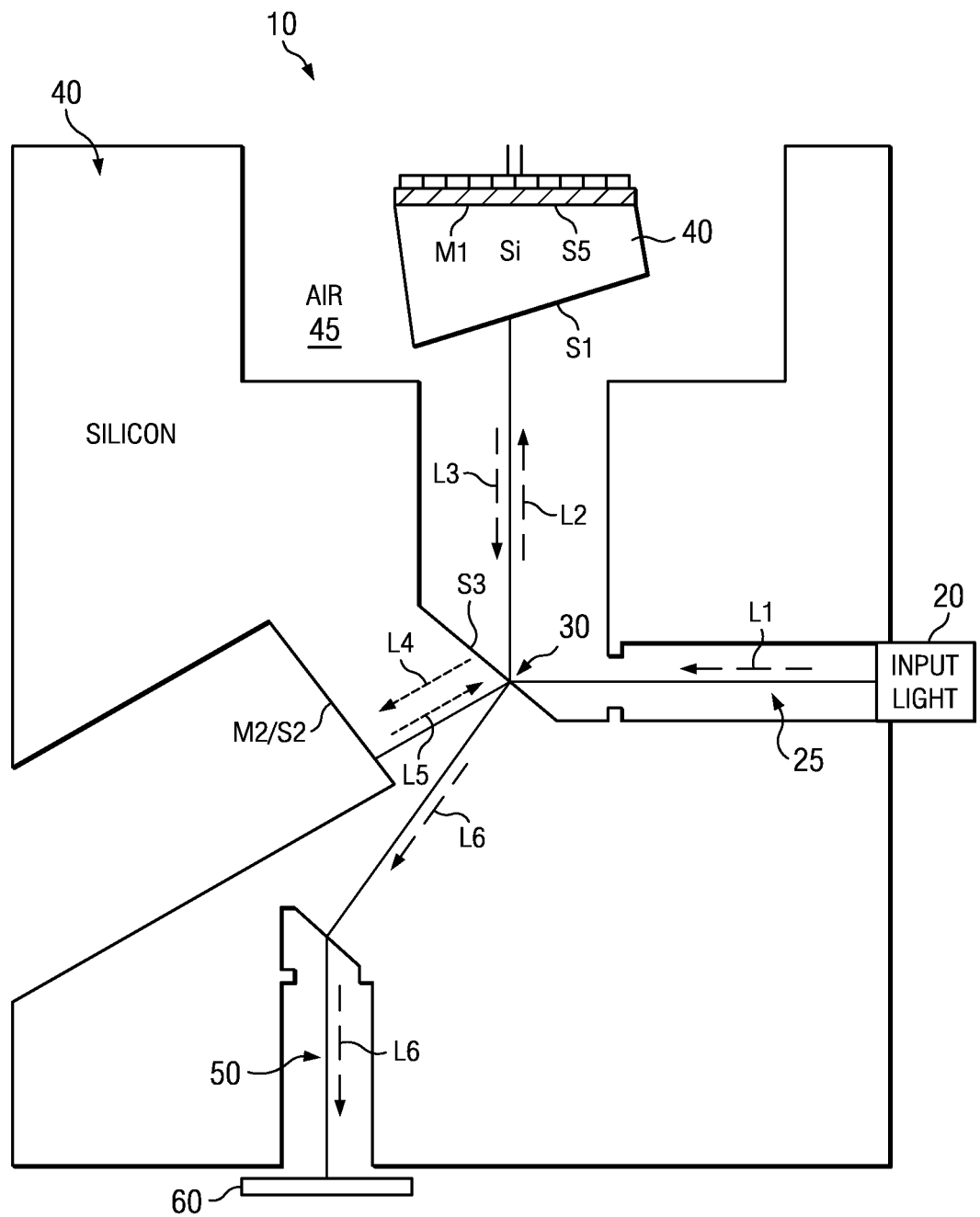
FIG. 7 is a diagram illustrating an exemplary partial compensated MEMS spectrometer architecture, in accordance with the present invention.

FIG. 7 illustrates yet another architecture for a MEMS-based spectrometer 10 that provides partial compensation of the verticality and dispersion problems. In addition, the architecture of FIG. 7 reduces the insertion loss produced from surfaces S1 and S2 as compared to the architecture shown in FIGS. 3A and 3B. For example, in FIG. 7, mirror M2 metallization is removed, and surface S2 is used as a partial reflector (i.e., using the refractive index difference between the silicon 40 and the air 45) to represent an effective mirror M2. In other embodiments, metallization may be deposited on S2 to use it as a fixed mirror. In this architecture, the two thicknesses (d1 and d2, shown in FIG. 4) may not be equal to allow for some phase shift corresponding to the air propagation, thus producing only partial dispersion compensation. In addition, the two mirrors M1 and M2 are not completely parallel (i.e., the tilt angles are in different directions), thus producing only partial tilt angle compensation.

In an exemplary operation, incident beam L1 enters the partially compensated MEMS-based spectrometer 10 through input fiber groove 25 and propagates through the input fiber groove 25 until it reaches the half plane beam splitter 30 formed on surface S3. Upon impinging the half plane beam splitter 30, the incident beam L1 is split into two interfering beams L2 and L4. L2 propagates in air 45 towards mirror M1, while L4 propagates in silicon 40 towards surface/mirror S2/M2. In particular, L2 propagates first through air 40 until impinging upon surface S1 of silicon 40, and then propagates through the silicon medium 40 to reach the mirror M1. L4 propagates through silicon 40 until reaching surface/mirror S2/M2 of the silicon medium 40.

Beam L2 is reflected by mirror M1, thus producing reflected beam L3, while beam L4 is reflected by surface/mirror S2/M2, thus producing reflected beam L5. Both beams L3 and L5 take the same optical path (in the opposite direction) after reflection back towards the half plane beam splitter 30. The interference pattern L6 produced as a result of reflected beams L3 and L5 interfering at the beam splitter 30 propagates through silicon 40 until it is output via output fiber groove 50 towards detector 60.

Figure 8:
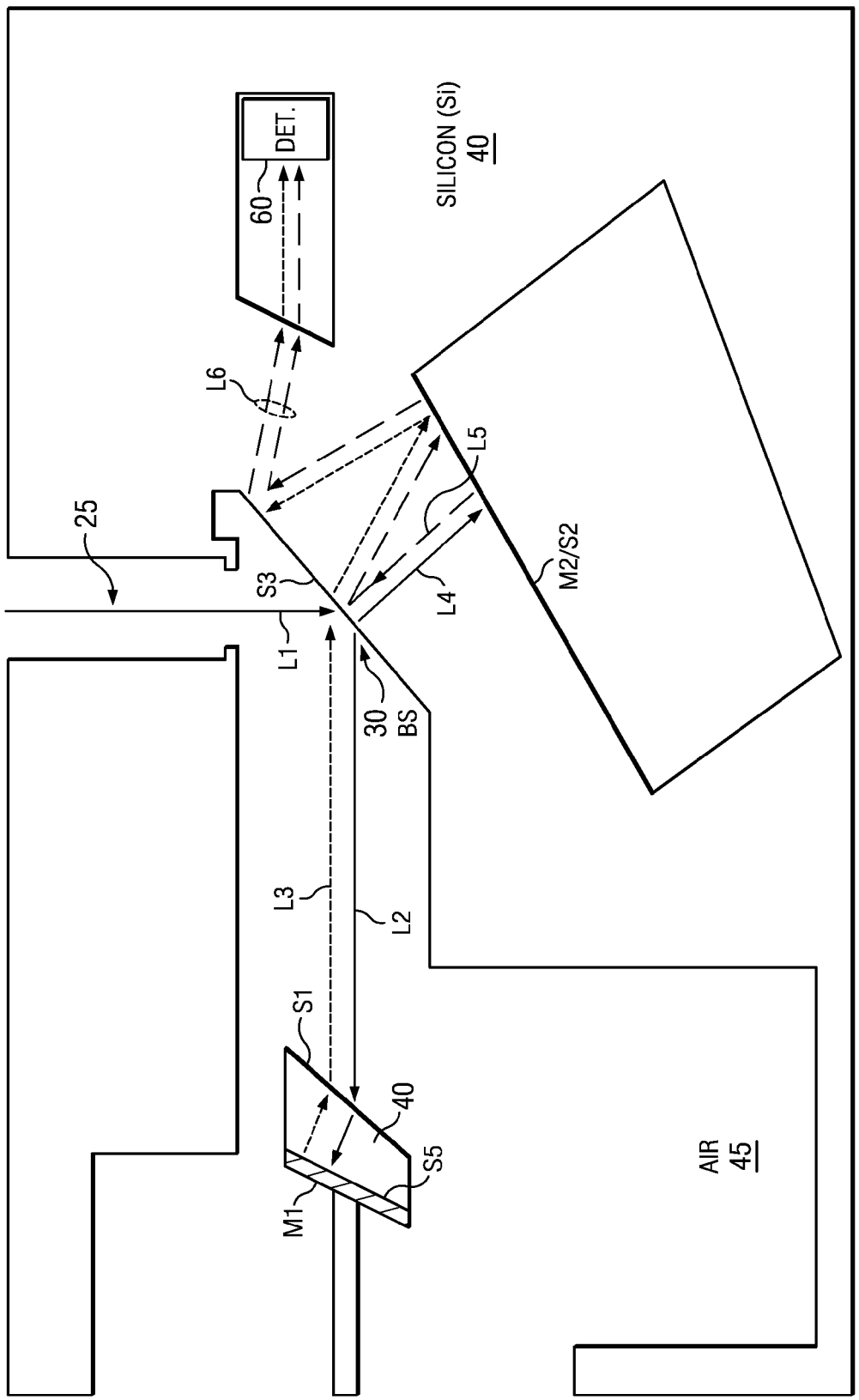
FIG. 8 is a diagram illustrating another exemplary partial compensated MEMS spectrometer architecture, in accordance with embodiments of the present invention.

Referring now to FIG. 8, there is illustrated another partially compensated MEMS-based spectrometer 10. In FIG. 8, the surface S2 operates not only as a partial reflector (S2/M2), but also to guide the interference pattern L6 to the detector through total internal reflection between surfaces S2 and S3.

In an exemplary operation, incident beam L1 enters the partially compensated MEMS-based spectrometer 10 through input fiber groove 25 and propagates through the input fiber groove 25 until it reaches the half plane beam splitter 30 formed on surface S3. Upon impinging the half plane beam splitter 30, the incident beam L1 is split into two interfering beams L2 and L4. L2 propagates in air 45 towards mirror M1, while L4 propagates in silicon 40 towards surface/ mirror S2/M2. In particular, L2 propagates first through air 40 until impinging upon surface S1 of silicon 40, and then propagates through the silicon medium 40 to reach the mirror M1. L4 propagates through silicon 40 until reaching surface/mirror S2/M2 of the silicon medium 40.

Beam L2 is reflected by mirror M1, thus producing reflected beam L3, while beam L4 is reflected by surface/mirror S2/M2, thus producing reflected beam L5. Both beams L3 and L5 take the same optical path (in the opposite direction) after reflection back towards the half plane beam splitter 30. The interference pattern L6 produced as a result of reflected beams L3 and L5 interfering at the beam splitter 30 propagates through silicon 40 until reaching surface/mirror S2/M2 where it is reflected via total internal reflection between S3 and S2 until output via output fiber groove 50 towards detector 60.

Figure 9A:
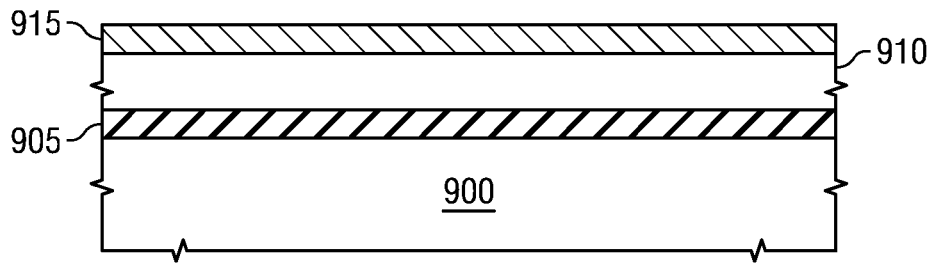
FIGS. 9A-9J illustrate exemplary fabrication process steps for fabricating a compensated MEMS spectrometer, in accordance with embodiments of the present invention.
Figure 9B:
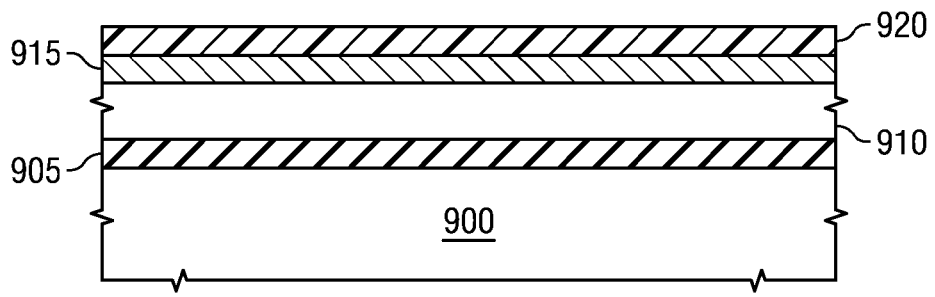
Figure 9C:
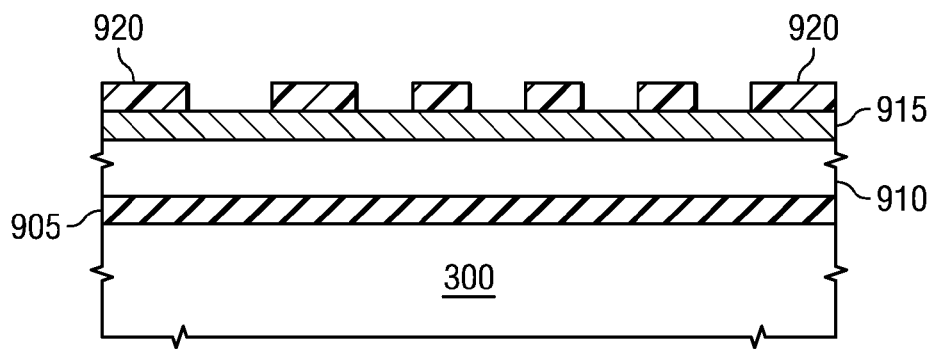
Figure 9D:
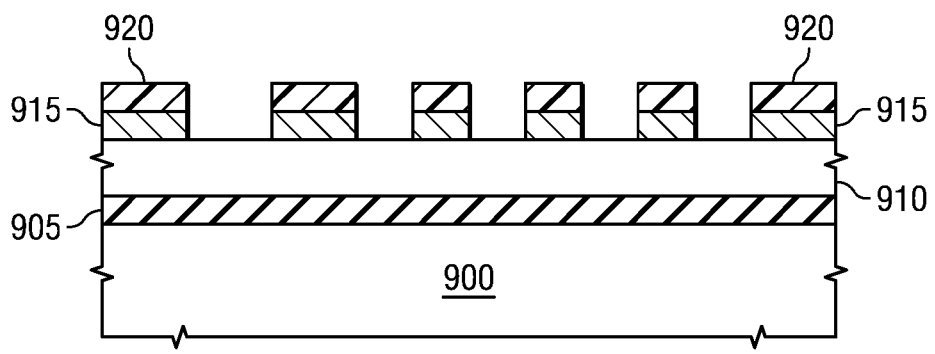
Figure 9E:
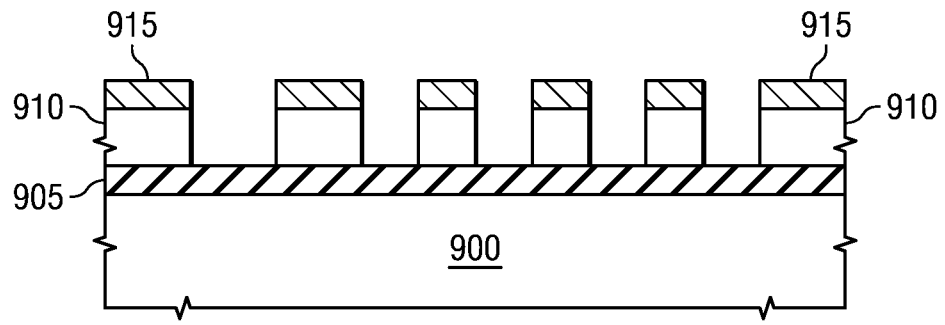
Figure 9F:
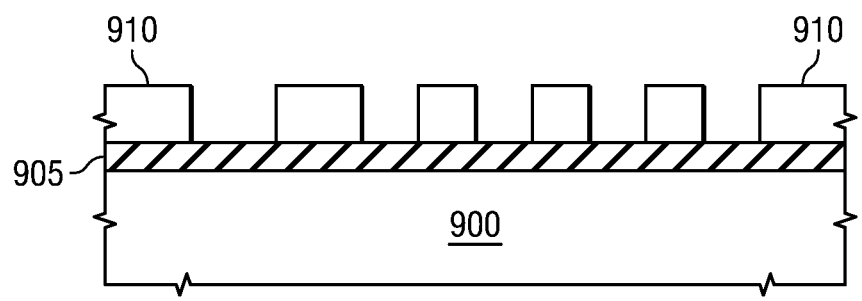

An exemplary fabrication process of a compensated MEMS-based spectrometer is shown in FIGS. 9A-9J. In FIG. 9A, an aluminum sputtering step is performed over an SOI wafer (layers 900-910) to form an aluminum layer 915, which functions as a mask for a subsequent etching of the top silicon layer 910 of the SOI wafer using DRIE, as shown in FIG. 9E. In FIG. 9B, a photo-resist material 920 is spun over the aluminum layer. In FIG. 9C, a lithography step is performed for realizing the mirrors, half plane beam splitter(s), fiber grooves, detector(s) and the electrostatic actuator. The lithography pattern in the photo-resist material 920 is transferred to the aluminum mask 915 by plasma chlorine etching of the aluminum layer, as shown in FIG. 9D. DRIE is then applied to the wafer until reaching the oxide etch stop layer 905 of the SOI, as shown in FIG. 9E. Then, in FIG. 9F, the remaining aluminum mask 915 is removed using an Alu etch.

Figure 9G:
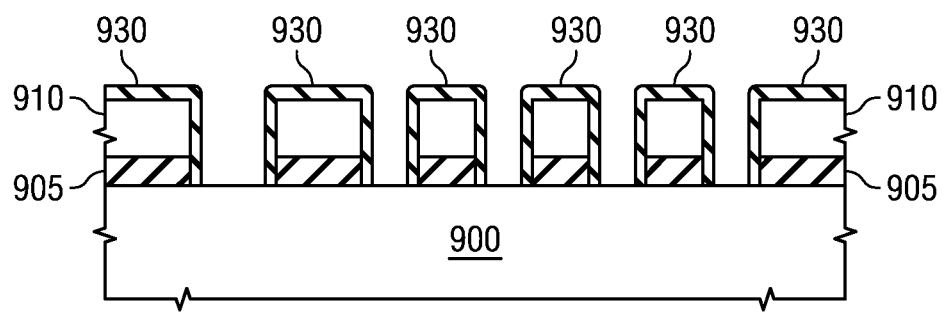
Figure 9H:
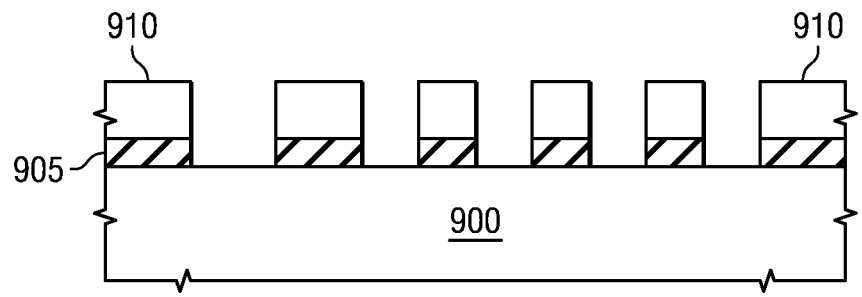
Figure 9I:
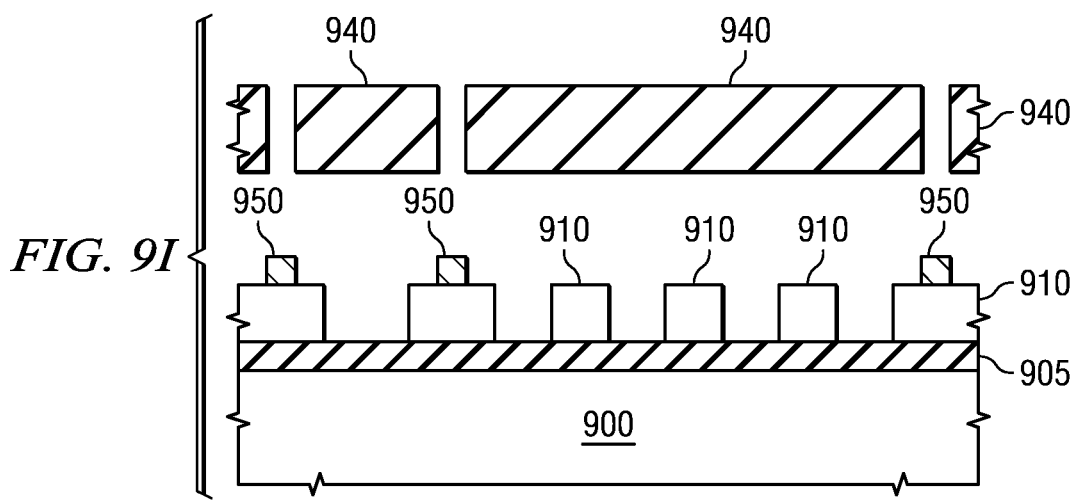
Figure 9J:
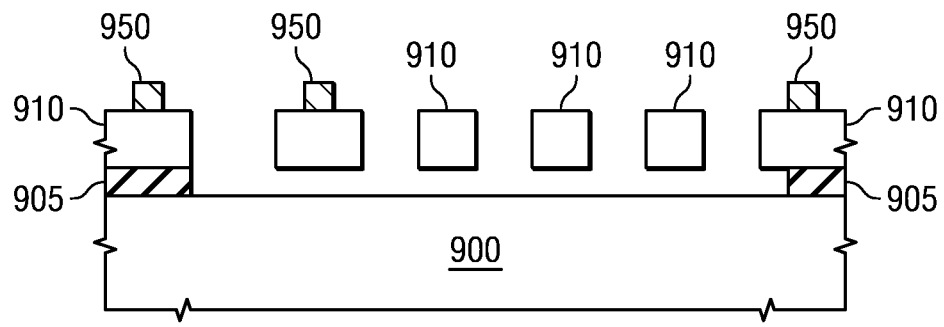

Turning now to FIG. 9I, a shadow mask 940 is used for the selective metallization 950 of the micromirrors and reflecting surfaces, as well as for creating connection pads. As shown in FIG. 9I, the shadow mask 940 is placed over the SOI substrate 900-910 to selectively sputter Cr/Au 950 onto desired portions of the top silicon layer 910. In embodiments in which non-metallic mirrors, such as Bragg mirrors, are used, the shadow mask step is not performed, and the pad metallization may be carried out at the beginning provided that metallization thickness is strong enough to survive the rest of the process steps. As shown in FIG. 9J, moving structures such as comb fingers, spring and moving mirror are released by etching the buried $SiO_2$ layer 305 using HF, while fixed structures are not released due to the wider area of the $SiO_2$ beneath. It should be understood that although a comb drive actuator is described herein, the moving mirrors could be actuated using any MEMS actuator(s) that can be fabricated by compatible technology. For example, the actuators can be fabricated with the spectrometer using the same previous steps on the same mask.

In embodiments in which the Bosch process is used for DRIE etching (shown in FIG. 9E), rough mirror surfaces may result due to the periodic nature of the process. Thus, as shown in FIG. 9G, growing a thin oxide layer 930 on the surfaces and then removing it by HF, as shown in FIG. 9H, can be useful before structure release to ensure a smoother mirror surface. It should be understood though that optical surface smoothing can be performed using any available technique, such as high temperature annealing, etching or oxidation. However, if a cryogenic DRIE process is used in FIG. 9E, the process steps shown in FIGS. 9G and 9H would be unnecessary since a smoother surface is obtained directly after etching. In addition, the aluminum mask shown in FIG. 9A is not necessary, as the process tends to have better selectivity between a photo-resist material and silicon at cryogenic temperatures.

As will be recognized by those skilled in the art, the innovative concepts described in the present application can be modified and varied over a wide range of applications. Accordingly, the scope of patents subject matter should not be limited to any of the specific exemplary teachings discussed, but is instead defined by the following claims.

We claim:

1. A Micro Electro-Mechanical System (MEMS) interferometer, comprising:
a beam splitter formed on a first surface of a first medium at an interface between the first medium and a second medium and optically coupled to receive an incident beam and to split said incident beam into a first interfering beam propagating in the first medium and a second interfering beam propagating in the second medium;
a first mirror formed on a second surface of the first medium and optically coupled to receive the first interfering beam and to reflect the first interfering beam to produce a first reflected interfering beam;
a second minor formed on a third surface of the first medium and optically coupled to receive the second interfering beam and to reflect the second interfering beam to produce a second reflected interfering beam;
tilt angle compensating surfaces of the first medium formed at respective additional interfaces between the first medium and the second medium in respective paths of the first interfering beam and the second interfering beam, each tilt angle compensating surface in one of the respective paths having a corresponding tilt angle compensating surface in the other of the respective paths such that the corresponding tilt angle compensating surfaces in each of the paths have a same tilt angle with respect to a plane of a substrate on which the MEMS interferometer is formed, at least one of the second surface and the third surface being one of the tilt angle compensating surfaces;
a detector optically coupled to detect an interference pattern produced as a result of interference between the first reflected interfering beam and the second reflected interfering beam; and
an electrostatic actuator coupled to one of the first mirror and the second minor to cause a displacement thereof, the displacement producing an optical path length difference between the first reflected interfering beam and the second reflected interfering beam equal to twice the displacement.

2. The interferometer of claim 1, wherein the first medium is silicon and the second medium is air and further comprising:
a silicon on insulator (SOI) wafer including a top layer and a bottom layer forming the substrate;
wherein the beam splitter, the first minor, the second mirror, the balancing interfaces tilt angle compensating surfaces and the electrostatic actuator are photolithographically defined within the top surface of the SOI wafer;
wherein the electrostatic actuator and the one of the first minor and the second mirror coupled to the electrostatic actuator are released by sacrificial etching between the top layer of the SOI wafer and the bottom layer of the SOI wafer.

3. The interferometer of claim 2, wherein the first surface, the second surface, the third surface and the tilt angle compensating surfaces are each formed by etching away part of the top surface of the SOI wafer using a Deep Reactive Ion Etching (DRIE) process.

4. The interferometer of claim 3, wherein the respective tilt angles of the first surface, the second surface and the third surface are substantially equal and substantially in the same direction.

5. The interferometer of claim 4, wherein the third surface is oriented with respect to a direction of propagation of the second interfering beam to cause the second interfering beam to propagate from the second medium through the first medium to reach the second mirror.

6. The interferometer of claim 1, wherein the interferometer is used as a Fourier Transform (FT) spectrometer and further comprising:
   in a first interferometer arm:
      a first section of the first medium having the first surface on which the beam splitter is formed; and
      the second surface of the first medium on which the first mirror is formed; and
   in a second interferometer arm:
      a second section of the first medium having the third surface on which the second minor is formed and a first tilt angle compensating surface, the first tilt angle compensating surface opposing the third surface and directing the second interfering beam towards the third surface;
   wherein the respective tilt angles between the substrate and each of the beam splitter, the first minor and the second minor are all the same.

7. The interferometer of claim 6, wherein a thickness of the first section is substantially equal to a thickness of the second section such that the first interfering beam and the second interfering beam traverse substantially equal distances through the first medium producing a substantially equal phase error in the first reflected interfering beam and the second reflected interfering beam.

8. The interferometer of claim 6, wherein the first section includes the second surface such that the first surface opposes the second surface on the first section to enable internal reflection of the second interfering beam through the first section.

9. The interferometer of claim 8, wherein the first minor is formed on the second surface at a second additional interface between the first medium and the second medium such that the first minor functions as a partial internal reflector.

10. The interferometer of claim 8, wherein the second surface further guides the interference pattern towards the detector via total internal reflection through the first medium between the second surface and the first surface.

11. The interferometer of claim 8, wherein the second surface is optically coupled to receive the interference pattern and to direct the interference pattern towards the detector.

12. The interferometer of claim 6, wherein:
   the first interfering arm further includes a third section of the first medium separated from the first section by an area of the second medium, the third section having the second surface; and
   the first section further includes a second tilt angle compensating surface, the second tilt angle compensating surface opposing the first surface and directing the first interfering beam towards the second surface.

13. The interferometer of claim 6, wherein the first surface has a size substantially equal to an input spot size of the incident beam and a thickness of the first section is adjusted to minimize undesired reflected beams facing the first surface.

14. The interferometer of claim 1, wherein the first mirror is positioned at an angle perpendicular to the first interfering beam and the second mirror is positioned at an angle perpendicular the second interfering beam.

15. The interferometer of claim 1, wherein:
   the beam splitter consists of a single reflecting and refracting surface forming an interface between the first medium and the second medium;
   the first interfering beam is a refracted beam produced from a partial refraction of the incident beam from the single reflecting and refracting surface; and
   the second interfering beam is a reflected beam produced from a partial reflection of the incident beam from the single reflected and refracting surface.

16. The interferometer of claim 1, wherein at least one of the first minor and the second minor is a metallic mirror.

17. The interferometer of claim 1, wherein the one of the first minor and the second minor coupled to the actuator is a moving minor and the other of the first minor and the second minor is a fixed minor.

18. The interferometer of claim 1, further comprising:
   an input fiber groove optically coupled to provide the incident beam to the beam splitter; and
   an output fiber groove optically coupled to provide the interference pattern to the detector.

19. The interferometer of claim 1, wherein the interferometer is used as a Fourier Transform Infrared Spectroscopy (FTIR) spectrometer.

20. The interferometer of claim 1, wherein in normal alignment conditions in which the tilt angle compensating surfaces are not perpendicular to respective directions of beam propagation, an angle between a plane of one of the tilt angle compensating surfaces and a respective direction of beam propagation is designed to minimize an angle between the first reflected interfering beam and the second reflected interfering beam and the wavelength dependence thereof.

* * * * *